United States Patent
Blank et al.

(10) Patent No.: US 6,256,563 B1
(45) Date of Patent: Jul. 3, 2001

(54) CONFIGURATION FOR CONTROLLING AN OCCUPANT RESTRAINT DEVICE IN A MOTOR VEHICLE

(75) Inventors: Thomas Blank, Karlsruhe; Gerhard Mader, Thalmassing; Richard Vogt, Willstätt, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/436,479

(22) Filed: Nov. 8, 1999

Related U.S. Application Data

(63) Continuation of application No. PCT/DE98/01220, filed on May 4, 1998.

(30) Foreign Application Priority Data

May 7, 1997 (DE) .............................................. 197 19 454

(51) Int. Cl.[7] ...................................................... G06F 7/00
(52) U.S. Cl. ................. 701/45; 701/36; 701/46; 280/734; 280/735; 180/271; 180/282; 307/9.1
(58) Field of Search ................................... 701/45, 46, 36; 280/735, 734, 750; 307/9.1, 10.1; 340/436, 438; 180/268, 271, 274, 282

(56) References Cited

U.S. PATENT DOCUMENTS 5,995,892 * 11/1999 Kiribayashi et al. ................... 701/45

FOREIGN PATENT DOCUMENTS

0686533A1 12/1995 (EP) .
WO 89/11986 12/1989 (WO) .

* cited by examiner

*Primary Examiner*—William A. Cuchlinski, Jr.
*Assistant Examiner*—Yonel Beaulieu
(74) *Attorney, Agent, or Firm*—Herbert L. Lerner; Laurence A. Greenberg; Werner H. Stemer

(57) ABSTRACT

A configuration for controlling an occupant restraint device of a motor vehicle. The occupant restraint device is activated only whenever it is ascertained, by an evaluator, that simultaneously a signal of a first acceleration sensor and a signal of a second acceleration sensor indicate a collision. The sensitivity axes of the acceleration sensors are oriented differently.

17 Claims, 2 Drawing Sheets

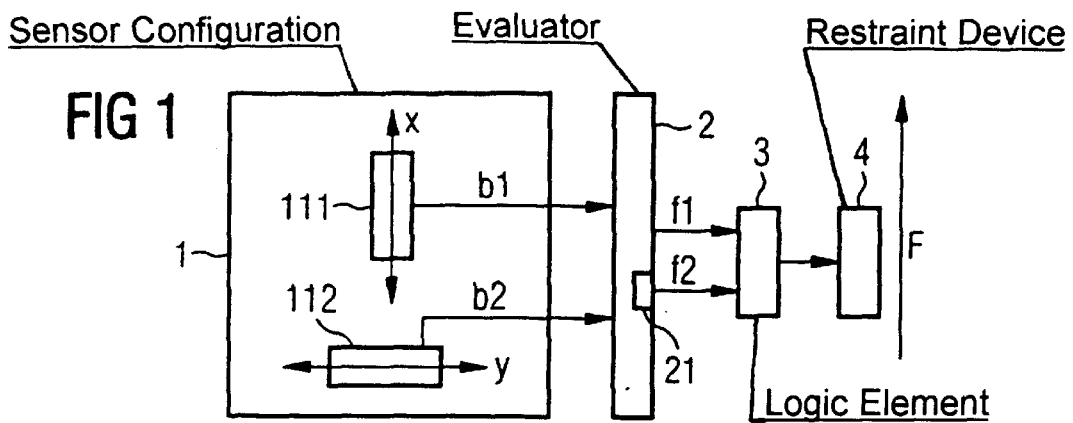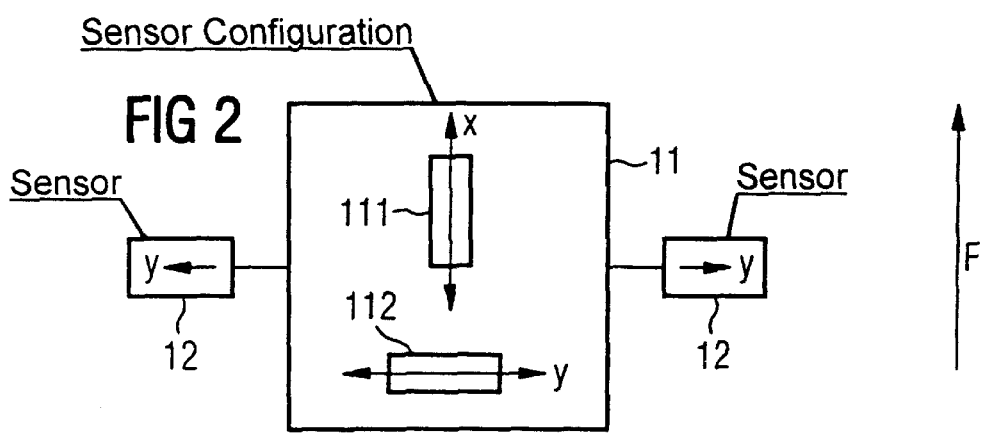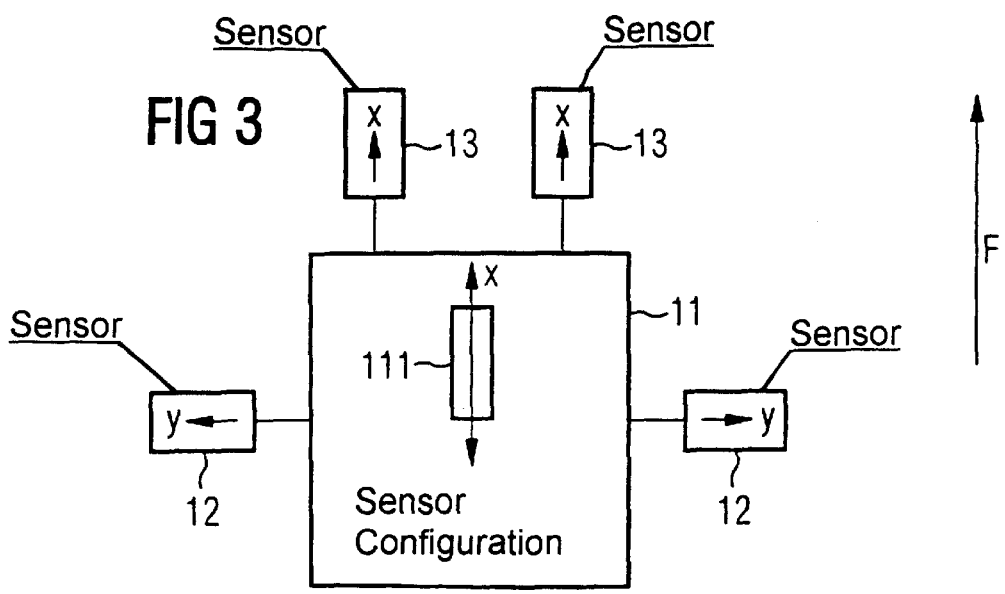

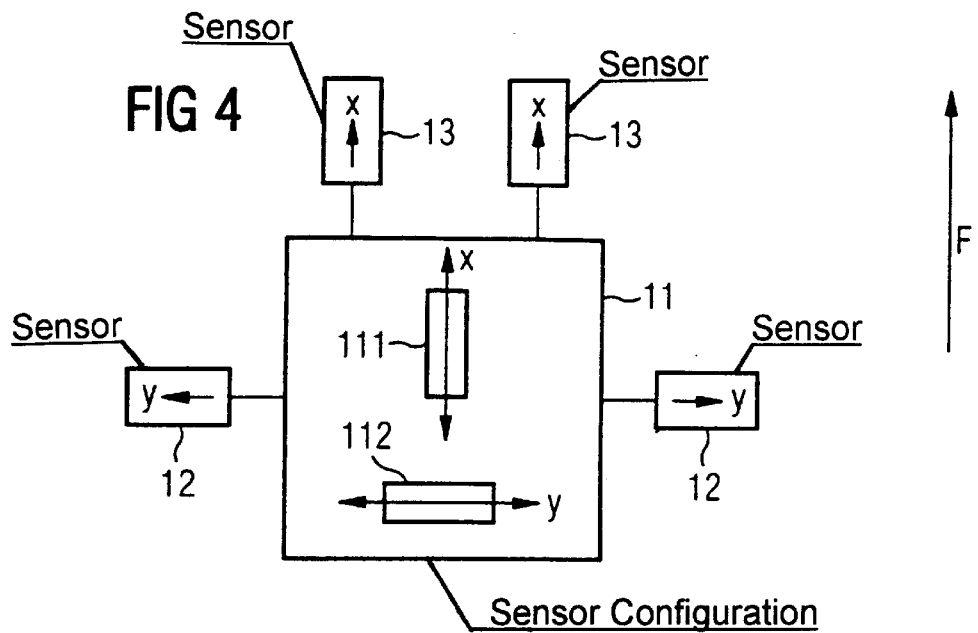
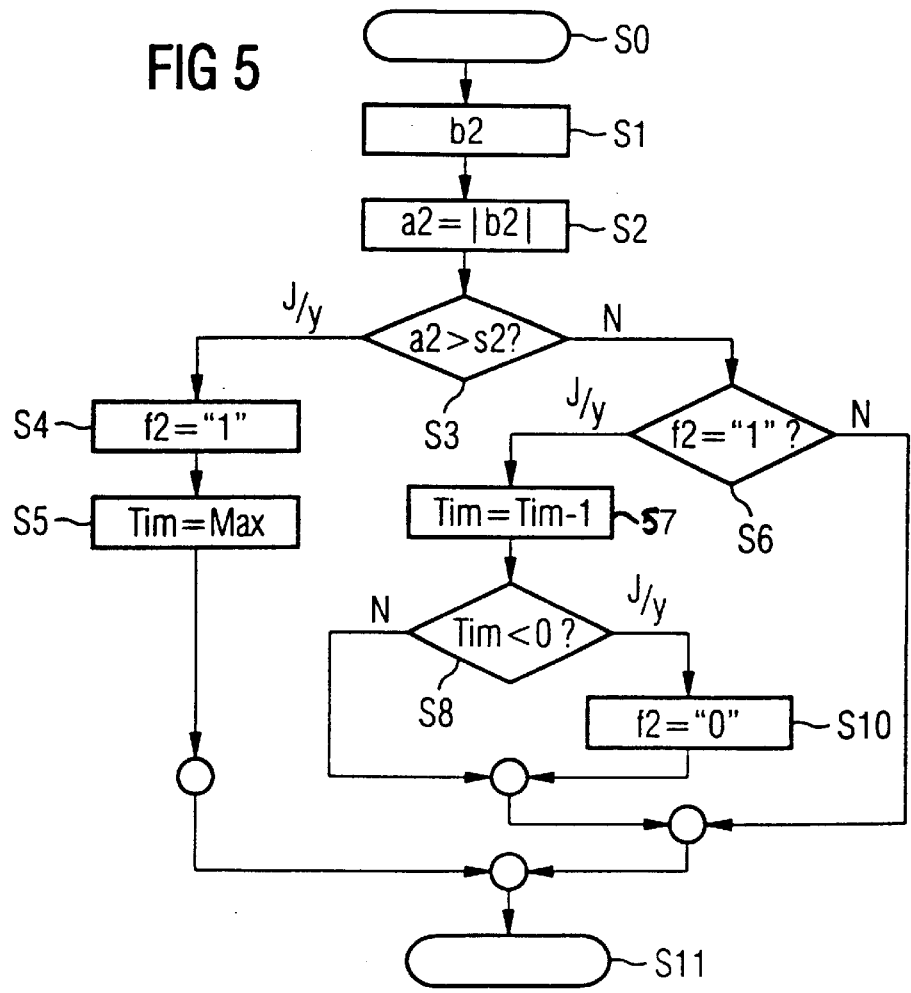

CONFIGURATION FOR CONTROLLING AN OCCUPANT RESTRAINT DEVICE IN A MOTOR VEHICLE

CROSS-REFERENCE TO RELATED APPLICATION

This is a continuation of copending International Application PCT/DE98/01220, filed May 4, 1998, which designated the United States.

BACKGROUND OF THE INVENTION

Field of the Invention

The invention relates to a configuration for controlling an occupant restraint device in a motor vehicle. The configuration contains two acceleration sensors with differently oriented sensitivity axes and an evaluator for evaluating sensor signals. The evaluator outputs first and second enable signals in dependence on the output signals from the acceleration sensors and the occupant restraint device is triggered in dependence on the enable signals.

A known configuration includes an acceleration sensor for detecting a collision. If an evaluator ascertains from the acceleration signal of the acceleration sensor that a sufficiently strong impact is occurring, then the associated occupant restraint device, such as an air bag, belt tightener, or the like is tripped. According to Published, Non-Prosecuted German Patent Application DE 40 16 644 A1, such a configuration contains a mechanical acceleration switch, whose sensitivity axis is oriented the same way as that of the acceleration sensor. The acceleration switch in particular prevents mistaken tripping because of a defective acceleration sensor or evaluator. Published, Non-Prosecuted German Patent Application DE 40 16 644 A1 also proposes replacing the acceleration switch with a further acceleration sensor and an evaluation circuit downstream from it.

From International Patent Application WO 89/11986, a configuration for controlling an occupant restraint device of a motor vehicle is known that has two acceleration sensors, with differently oriented sensitivity axes. The first acceleration sensor is sensitive to accelerations parallel to the longitudinal axis of the vehicle, and the second acceleration sensor is sensitive to transverse vehicle accelerations. An evaluator evaluates the acceleration signals furnished by the acceleration sensors and activates the associated occupant restraint device when the longitudinal vehicle acceleration exceeds a threshold value, which is set high, or when the amount and direction of an acceleration vector, formed from the longitudinal and transverse acceleration signals, exceeds predetermined values. Thus the occupant restraint device is also tripped in an oblique collision which is highly dangerous for the occupants, but in which the longitudinal acceleration alone would not exceed its assigned threshold value.

From Published, Non-Prosecuted German Patent Application DE 37 17 427 A1, a device for tripping an occupant restraint device is known which is meant to be tripped in the event of a frontal collision or an oblique collision from the front, but not in a side or rear-end collision. To that end, the configuration includes two sensors disposed at an angle of less than 90° from one another, each of them being oriented approximately ±30° from the longitudinal axis of the vehicle. The restraint is tripped when both sensors furnish a significant signal.

From Published, Non-Prosecuted German Patent Application DE 195 37 546 A1, a device for tripping an occupant restraint device with two sensors disposed orthogonally to one another is known, in which to reduce the computing power of an evaluator that processes the signals, only the signal of a sensor from whose direction a collision is expected is evaluated.

SUMMARY OF THE INVENTION

It is accordingly an object of the invention to provide a configuration for controlling an occupant restraint device in a motor vehicle which overcomes the above-mentioned disadvantages of the prior art devices of this general type, in which it is assured that mistaken tripping of an occupant restraint device in a motor vehicle is prevented and the configuration is of simple construction.

With the foregoing and other objects in view there is provided, in accordance with the invention, a configuration for controlling an occupant restraint device of a motor vehicle, containing two acceleration sensors including a first acceleration sensor outputting a first acceleration signal and a second acceleration sensor outputting a second acceleration signal, the first acceleration sensor having a first sensitivity axis for picking up longitudinal vehicle accelerations and the second acceleration sensor having a second sensitivity axis oriented substantially transversely to the first sensitivity axis of the first acceleration sensor; and an evaluator receiving the first acceleration signal and the second acceleration signal from the two acceleration sensors, the evaluator generates a first enable signal dependent at least on the first acceleration signal, and the evaluator generates a second enable signal dependent on the second acceleration signal, a tripping of the occupant restraint device initiated only if both the first enable signal and the second enable signal occur simultaneously.

The evaluator generates the first enable signal which is dependent at least on the acceleration signal of the first acceleration sensor, and the second enable signal which is dependent on the acceleration signal of the second acceleration sensor. Tripping of the occupant restraint device is initiated only whenever both enable signals occur simultaneously.

To prevent mistaken tripping from being caused, perhaps by a defective acceleration sensor, the first acceleration sensor, which is necessary for tripping the occupant restraint device, is accompanied not by a redundant acceleration sensor or a mechanical acceleration switch with a sensitivity axis oriented in the same way but instead by a second acceleration sensor with a differently oriented sensitivity axis. With the aid of the acceleration signal of the second acceleration sensor, it is assured that a collision ascertained by the first acceleration sensor is actually occurring. The invention is based on the recognition that in a collision from a particular direction, acceleration components that are not only in this direction can be detected. In such a collision, acceleration components in other space axes as well can be detected, since the collision energy is dissipated not only by deformation of the vehicle body in the impact direction. The collision energy is also dissipated by instrument-measurable vehicle vibrations in directions in space that do not match the impact direction.

The sensitivity axis of the second acceleration sensor acting as a safety sensor is oriented orthogonally to the sensitivity axis of the acceleration sensor acting as a tripping sensor. If the first acceleration sensor preferably has a sensitivity axis parallel to the longitudinal axis of the vehicle and is thus sensitive to longitudinal vehicle accelerations and preferentially in a frontal collision trips the occupant restraint device for frontal collision protection, such as a driver-side or passenger-side air bag or belt tightener, then the second acceleration sensor embodied as a safety sensor preferably detects transverse vehicle accelerations or accelerations along a horizontal axis of the vehicle. The orthogonal orientation of the second acceleration sensor relative to the first acceleration sensor is advantageous in the sense that in a collision, the vehicle has a tendency to vibration especially in the space axes orthogonal to the impact direction. It is in these axes that acceleration signals with the greatest signal-to-noise ratio can be picked up.

If the first acceleration sensor is disposed preferentially for picking up transverse vehicle accelerations and thus for triggering the occupant restraint device providing side impact protection—such as a side air bag or a head air bag—then the second acceleration sensor is preferentially sensitive to longitudinal vehicle accelerations or vehicle accelerations along the vertical axis of the vehicle. It is understood that the second acceleration sensor can also be oriented in some other way in the vehicle, as long as its orientation is clearly distinguished from that of the first acceleration sensor.

In the invention, the acceleration signal of the first acceleration sensor is evaluated in order to make a decision as to whether tripping of the associated occupant restraint device is or is not necessary. To arrive at a decision, it is also advantageously possible to use the acceleration signal of the second acceleration sensor, for instance for detecting an oblique collision. The tripping signal is compared with a first threshold value, which for tripping distinguishes sufficiently high tripping signal values from tripping signal values that are not high enough. The first threshold value can be embodied as constant or variable. From the first acceleration signal, and optionally other signals relevant to a collision as well, a plurality of individual tripping criteria can also be formed, which in turn lead by logical linkage to a tripping decision.

It is essential to the invention that the signal of the second acceleration sensor be used as a criterion for ascertaining whether or not any collision has occurred at all. To that end, a safety signal is formed, which is preferably determined solely by the second acceleration signal and by both vehicle-specific and other parameters, and this signal is compared with a second threshold value. The second threshold value distinguishes safety signal values that are high enough for a collision from those that are not high enough for a collision. In accordance with the different functions of the tripping signal and the safety signal, the threshold values associated with these signals differ in their magnitude. The first threshold value, associated with the tripping signal, is higher than the second threshold value associated with the safety signal, preferably being more than twice as high.

The safety signal is determined in particular by the amount of the second acceleration signal. In a further advantageous refinement, the safety signal is determined by the integral over the amount of the second acceleration signal. Forming the amount particularly in an ensuing integration is advantageous, because in a collision, the second acceleration signal oscillates essentially about the zero point, and without prior forming of the amount, the integration of the second acceleration signal would result in that negative and positive amounts of the second acceleration signal would cancel one another out.

If a configuration has an acceleration sensor for longitudinal vehicle accelerations for controlling the occupant restraint device for frontal collision protection and a further acceleration sensor for transverse vehicle accelerations for controlling an occupant restraint device for side impact protection, then embodying the configuration as follows according to the invention proves to be extremely advantageous. For frontal collision detection, the transverse acceleration sensor is used as a safety sensor, to preclude a defective longitudinal acceleration sensor from causing mistaken tripping of the restraint device providing frontal collision protection. At the same time, the longitudinal acceleration sensor is used as a safety sensor, to preclude a defective transverse acceleration sensor from causing mistaken tripping of the restraint device providing side impact protection. In such a configuration, only two acceleration sensors are needed so as both to trip in the event of an impact from any direction and at the same time to be able to prevent mistaken tripping.

Both of the acceleration sensors are preferably embodied as testable acceleration sensors so that the operability of the sensors and in particular the deflectability of their seismic masses, which is induced electrostatically, can be checked, both when the configuration is put into operation, and also during operation.

Other features which are considered as characteristic for the invention are set forth in the appended claims.

Although the invention is illustrated and described herein as embodied in a configuration for controlling an occupant restraint device in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, block circuit diagram of a tripping configuration according to the invention;

FIGS. 2–4 are block diagrams of various sensor configurations of the tripping configuration; and FIG. 5 is a flow chart for steps taken in an evaluator to ascertain a second enable signal of the tripping configuration.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a block circuit diagram of a tripping configuration according to the invention. The configuration contains a sensor configuration 1, an evaluator 2, a logic element 3, and an occupant restraint device 4. The sensor configuration 1 has a first acceleration sensor 111 with a sensitivity axis x and a second acceleration sensor 112 with a sensitivity axis y. In a travel direction marked by an arrow F, the first acceleration sensor 111 picks up longitudinal vehicle accelerations, and the second acceleration sensor 112 picks up transverse vehicle accelerations. The sensitivity axes x and y of the acceleration sensors 111 and 112 are indicated by double arrows.

The occupant restraint device 4 serves to protect against frontal collisions. Thus for tripping the occupant restraint device 4, a first acceleration signal b1, furnished by the first acceleration sensor 111 and evaluated in the evaluator 2, is definitive. If a tripping signal determined by the first acceleration signal b1 exceeds a first threshold value, then a collision sufficiently forceful to trip the occupant restraint device 4 is occurring, and a first enable signal f1 is therefore furnished to the logic element 3. At the same time, by assessment of a second acceleration signal b2 in the evaluator 2, it is checked whether the second acceleration sensor 112 is also detecting a collision. To that end, the amount of the second acceleration signal b2 is formed and compared with a second threshold value, which is lower than the threshold value associated with the first acceleration signal b1. If the amount of the second acceleration signal b2 exceeds the second threshold value, then a second enable signal f2 is furnished to the logic element 3. The logic element 3 is embodied as an AND gate, so that the occupant restraint device 4 is activated only whenever both the first and the second enable signals f1 and f2 are simultaneously present. As soon as the second threshold value is exceeded by the amount of the second acceleration signal b2, a hold element 21 of the evaluator 2 generates a second enable signal f2 with a defined minimum duration. It is thus attained that a tripping operation that is desired, but is prevented by a brief drop in the second acceleration signal b2 and a simultaneously occurring enable signal f1, will nevertheless still be initiated.

The configuration of FIG. 1 can also control a further occupant restraint device, not shown, for side impact protection. To trip the further occupant restraint device, two further enable signals are needed. The enable signal that is definitive for tripping the further occupant restraint device is determined essentially by the transverse acceleration of the vehicle, or in other words the second acceleration signal b2, while conversely the enable signal definitive to preventing mistaken tripping of the further occupant restraint device is determined by the longitudinal vehicle acceleration, or in other words the first acceleration signal b1.

FIGS. 2–4 show sensor configurations for the configuration according to the invention; hereinafter, the central acceleration sensor for longitudinal accelerations will always be called the first acceleration sensor 111, and the central acceleration sensor for transverse accelerations will be called the second acceleration sensor 112. Because of the above-described multi-functionality of the acceleration sensors 111 and 112, acting as a tripping sensor or also as a safety sensor, the association defined for the claims—that is, the first acceleration sensor acting as the tripping sensor, and the second acceleration sensor as the safety sensor—is considered to be rescinded in the context of the description of FIGS. 2–4.

FIG. 2 shows a sensor configuration 11, disposed centrally—for instance in a transmission tunnel—in the vehicle, which includes the first acceleration sensor 111 for longitudinal vehicle accelerations and the second acceleration sensor 112 for transverse vehicle accelerations. The sensor configuration 11 also has two decentralized acceleration sensors 12 for transverse vehicle accelerations. The decentralized acceleration sensors 12 are preferably disposed near side panels of the vehicle, so that they can pick up a side impact close to the site of the collision. In the configuration of FIG. 2, the first acceleration sensor 111 serves to trip an occupant restraint device for frontal collision protection—hereinafter referred to as a front air bag—while the decentralized acceleration sensors 12 serve to trigger a restraint for side impact protection—hereinafter referred to as a side air bag. The second acceleration sensor 112 can be used according to the invention as a safety sensor for tripping the front air bag, as well as being used in a known manner as a safety sensor for tripping the side air bag. Alternatively or in addition, the first acceleration sensor 111 can also be used according to the invention as a safety sensor for the decentralized acceleration sensors 12.

FIG. 3 shows a further advantageous sensor configuration, with the central configuration 11 containing the first acceleration sensor 111 for longitudinal accelerations. The decentralized acceleration sensors 12 for transverse accelerations are also provided, as are decentralized acceleration sensors 13 for longitudinal accelerations. It is the decentralized acceleration sensors 12 that are definitive for tripping the side air bag. The first acceleration sensor 111 is used according to the invention as the safety sensor for the decentralized acceleration sensors 12. It is the decentralized acceleration sensors 13 that are definitive for tripping the front air bag, and the first acceleration sensor 111 serves in a known manner as a safety sensor.

In FIG. 4, the sensor configuration of FIG. 3 has been expanded by the centrally disposed second acceleration sensor 112 for transverse accelerations. Beyond the functionality of the configuration as described in FIG. 3, the second acceleration sensor 112 can serve in a known manner as a safety sensor for the decentralized acceleration sensors 12 for transverse accelerations. According to the invention, the second acceleration sensor 112 can serve, additionally or alternatively to the first acceleration sensor 111, as a safety sensor for tripping the front air bag.

FIG. 5, is a flow chart showing the calculation of the second enable signal f2, which is determined essentially by the second acceleration signal b2 of the second acceleration sensor 112 acting as a safety sensor. In step S0, a sequence of steps selected from among steps S1–S10 is run through; when step S11 is reached, the sequence begins over again at step S0. In step S1, the second acceleration signal b2 of the second acceleration sensor 112 is written into the evaluator 2. In step S2, the safety signal a2 is formed from a value of the second acceleration signal b2, before it is asked in a third step S3 whether the safety signal a2 is greater than an associated second threshold value s2. If so (path J/Y) then in step S4, the second enable signal F2 is set (=1), so that if the first enable signal f1 is simultaneously furnished by the evaluator 2, the associated occupant restraint device will be activated. In step S5, a timer Tim is set to a value Max. This is equivalent to a software version of a hold element. Beginning with step S0, the chronologically subsequent value of the second acceleration signal b2 is written in. If in step S3 the safety signal a2 is less than or equal to the second threshold value s2 (path N) then in step S6 it is asked whether the second enable signal f2 has already been set (=1). If not (path N) then there is no need to make a change, because both in the preceding time step and in the present time step, the safety signal a2 is less than or equal to the second threshold value s2. If however it is found in step S6 that the second enable signal f2 has already been set, (path J/Y), then in step S7 the timer Tim is reduced by one unit of time. In step S8, it is asked whether the timer Tim has elapsed. If so (path J/Y) then in step S10 the second enable signal f2 is reset, since at present the second threshold value s2 is not being exceeded by the safety signal a2, and the timer Tim for a second enable signal f2 set in an earlier time segment has also elapsed. If the timer Tim has not yet elapsed (path N beginning at step 8) then the second enable signal f2 stays set later on as well.

The evaluator 2 that performs these and all the other required calculations is preferably a microprocessor.

Optionally, however, the microprocessor 2 may perform only the calculation of the first enable signal f1, while the calculation of the second enable signal f2 is performed by an analog circuit configuration.

We claim:

1. A configuration for controlling an occupant restraint device of a motor vehicle, comprising:

two acceleration sensors including a first acceleration sensor outputting a first acceleration signal and a second acceleration sensor outputting a second acceleration signal, said first acceleration sensor having a first sensitivity axis for picking up longitudinal vehicle accelerations and said second acceleration sensor having a second sensitivity axis oriented substantially transversely to said first sensitivity axis of said first acceleration sensor; and an evaluator receiving the first acceleration signal and the second acceleration signal from said two acceleration sensors, said evaluator generating a first enable signal dependent at least on the first acceleration signal, and said evaluator generating a second enable signal dependent solely on the second acceleration signal, a tripping of the occupant restraint device initiated only if both the first enable signal and the second enable signal occur simultaneously.

2. The configuration according to claim 1, wherein the first enable signal is generated if a tripping signal dependent at least on the first acceleration signal exceeds a first threshold value, and the second enable signal is generated if a safety signal dependent on the second acceleration signal exceeds a second threshold value.

3. The configuration according to claim 2, wherein said second threshold value is embodied as lower than said first threshold value.

4. The configuration according to claim 2, wherein the safety signal has a value equal to that of the second acceleration signal.

5. The configuration according to claim 2, wherein the safety signal is determined by an integral of the second acceleration signal.

6. The configuration according to claim 2, wherein said evaluator has a hold element, said hold element generating the second enable signal with a minimum duration if the safety signal exceeds the second threshold value.

7. The configuration according to claim 1, wherein the second enable signal is determined exclusively fro m the second acceleration signal.

8. The configuration according to claim 1, wherein the occupant restraint device is intended for frontal collision protection.

9. The configuration according to claim 1, wherein the occupant restraint device is intended for collision protection.

10. A configuration for controlling an occupant restraint device of a motor vehicle, comprising:

two acceleration sensors including a first acceleration sensor outputting a first acceleration signal and a second acceleration sensor outputting a second acceleration signal, said first acceleration sensor and said second acceleration sensor disposed in a sensor configuration, said first acceleration sensor having a first sensitivity axis for picking up longitudinal vehicle accelerations and said second acceleration sensor having a second sensitivity axis oriented substantially transversely to said first sensitivity axis of said first acceleration sensor;

an evaluator receiving the first acceleration signal and the second acceleration signal from said two acceleration sensors, said evaluator generating a first enable signal dependent at least on the first acceleration signal, and said evaluator generating a second enable signal dependent on the second acceleration signal, a tripping of the occupant restraint device initiated only if both the first enable signal and the second enable signal occur simultaneously.

11. The configuration according to claim 10, wherein the first enable signal is generated if a tripping signal dependent at least on the first acceleration signal exceeds a first threshold value, and the second enable signal is generated if a safety signal dependent on the second acceleration signal exceeds a second threshold value.

12. The configuration according to claim 11, wherein said second threshold value is lower than said first threshold value.

13. The configuration according to claim 11, wherein the safety signal has a value equal to that of the second acceleration signal.

14. The configuration according to claim 11, wherein the safety signal is determined by an integral of the second acceleration signal.

15. The configuration according to claim 11, wherein said evaluator has a hold element, said hold element generating the second enable signal with a minimum duration if the safety signal exceeds the second threshold value.

16. The configuration according to claim 11, wherein the second enable signal is determined exclusively from the second acceleration signal.

17. The configuration according to claim 10, wherein the occupant restraint device is intended for frontal collision protection.

* * * * *